United States Patent
Hirasawa et al.

(10) Patent No.: US 11,648,705 B2
(45) Date of Patent: May 16, 2023

(54) WOOD PROCESSING SYSTEM

(71) Applicants: NATIONAL UNIVERSITY CORPORATION CHIBA UNIVERSITY, Chiba (JP); MAEDA CORPORATION, Tokyo (JP)

(72) Inventors: Gakuhito Hirasawa, Chiba (JP); Takashi Tsunakawa, Tokyo (JP); Daisaku Yamato, Tokyo (JP)

(73) Assignees: NATIONAL UNIVERSITY CORPORATION CHIBA UNIVERSITY, Chiba (JP); MAEDA CORPORATION, Tokyo (JP)

( * ) Notice: Subject to any disclaimer, the term of this patent is extended or adjusted under 35 U.S.C. 154(b) by 86 days.

(21) Appl. No.: 16/979,332

(22) PCT Filed: Mar. 20, 2019

(86) PCT No.: PCT/JP2019/011832
§ 371 (c)(1),
(2) Date: Sep. 9, 2020

(87) PCT Pub. No.: WO2019/182046
PCT Pub. Date: Sep. 26, 2019

(65) Prior Publication Data
US 2021/0001508 A1    Jan. 7, 2021

(30) Foreign Application Priority Data
Mar. 22, 2018  (JP) .............................. JP2018-054130

(51) Int. Cl.
*B27C 9/04*      (2006.01)
*B25J 11/00*     (2006.01)
(Continued)

(52) U.S. Cl.
CPC .............. *B27C 9/04* (2013.01); *B25J 11/0055* (2013.01); *B23Q 17/24* (2013.01); *B27B 27/04* (2013.01)

(58) Field of Classification Search
None
See application file for complete search history.

(56) References Cited

U.S. PATENT DOCUMENTS 10,150,226 B2 * 12/2018 Giles ........................ B27B 29/04
10,751,906 B2 *  8/2020 Hundegger ............. B27B 29/02
(Continued)

FOREIGN PATENT DOCUMENTS

| CN | 105522618 A | * | 4/2016 | ............... B27C 9/04 |
| CN | 106891392 A | * | 6/2017 | ............... B27C 9/04 |

(Continued)

OTHER PUBLICATIONS

English translation of Written Opinion issued in Intl. Appln. No. PCT/JP2019/011832 dated Apr. 23, 2019, previously cited in IDS filed Sep. 9, 2020.

(Continued)

*Primary Examiner* — Matthew Katcoff
(74) *Attorney, Agent, or Firm* — Rossi, Kimms & McDowell LLP

(57) ABSTRACT

Provided is a wood processing system including a wood conveying device having a longitudinal direction along one direction in the horizontal direction and being capable of conveying wood along the longitudinal direction; a multi-axis processing machine arranged on one side in the longitudinal direction of the wood conveying device, the multi-axis processing machine including a spindle capable of being attached with a first tool, and a spindle moving device having two or more linear axes perpendicular to one another and two or more rotational axes for moving the spindle; and (Continued)

at least one multi-articulated robot arranged along the wood conveying device on the other side in the longitudinal direction of the wood conveying device, the at least one multi-articulated robot including a wrist capable of being attached with a tool unit including a second tool, and an arm having six or more rotational axes for moving the wrist.

13 Claims, 8 Drawing Sheets

(51) Int. Cl.
*B23Q 17/24* (2006.01)
*B27B 27/04* (2006.01)

(56) References Cited

U.S. PATENT DOCUMENTS

| | | | |
|---|---|---|---|
| 10,857,692 B2* | 12/2020 | Strasky | B27B 1/007 |
| 2006/0259284 A1* | 11/2006 | Suzuki | B27M 1/08 |
| | | | 703/6 |
| 2010/0032178 A1* | 2/2010 | Koeder | B23D 59/002 |
| | | | 173/1 |
| 2012/0022677 A1* | 1/2012 | Suzuki | B27M 1/08 |
| | | | 700/98 |
| 2017/0043496 A1 | 2/2017 | Giles | |
| 2017/0129023 A1 | 5/2017 | Su | |
| 2017/0312933 A1* | 11/2017 | Schmieder | B27F 5/12 |

FOREIGN PATENT DOCUMENTS

| | | | | |
|---|---|---|---|---|
| CN | 106976132 A | * | 7/2017 | B27C 9/04 |
| CN | 108582464 A | | 9/2018 | |
| DE | 29821047 U1 | | 4/1999 | |
| DE | 102016223928 A1 | | 6/2017 | |
| EP | 0462940 A2 | | 12/1991 | |
| EP | 1712337 A1 | | 10/2006 | |
| EP | 1923183 A1 | | 5/2008 | |
| EP | 2165811 A2 | | 3/2010 | |
| JP | H04176535 A | | 6/1992 | |
| JP | H10329104 A | | 12/1998 | |
| JP | 2007152502 A | | 6/2007 | |
| JP | 2010036337 A | | 2/2010 | |
| JP | 2015102918 A | | 6/2015 | |
| JP | 6001106 B2 | | 10/2016 | |
| JP | 2017168065 A | | 9/2017 | |
| KR | 101744962 B1 | * | 6/2017 | B27C 9/04 |
| WO | 2007144922 A1 | | 12/2007 | |

OTHER PUBLICATIONS

International Preliminary Report on Patentability issued in PCT/JP2019/011832 dated Oct. 1, 2020. English translation provided.
International Search Report issued in Intl. Appln. No PCT/JP2019/011832 dated Apr. 23, 2019 English translation provided.
Written Opinion issued in Intl. Appln. No. PCT/JP2019/011832 dated Apr. 23, 2019.
Extended European Search Report issued in European Application No. 19772011.3 dated Apr. 1, 2021.
Office Action issued in European Appln. No. 19772011.3 dated Jan. 19, 2022.

* cited by examiner

WOOD PROCESSING SYSTEM

TECHNICAL FIELD

The present disclosure relates to a wood processing system for processing wood.

BACKGROUND

Conventionally, wood such as columns and beams constituting wooden houses have been processed mainly by manual work at construction sites, but in recent years, in order to reduce the construction period and labor costs, a precut method of processing wood by machine tools installed in factories, etc. prior to site construction has been carried out.

As described in Patent Document 1, there is a wood processing system for performing the precut method described above, which includes a plurality of process-specific processing machines including a cutting machine, an intermediate processing machine, a wood processing machine, and the like, which are arranged in process order from an upstream side of the wood processing line, and a plurality of line conveyors which are arranged on an upstream side and a downstream side of the processing machines and connect the processing machines in series in order to carry wood into and out of the processing machines. The wood processing system processes wood into a desired shape by performing necessary processing sequentially from a processing machine arranged on the upstream side of the wood processing line.

Further, as described in Patent Document 2, there is a wood processing system including a plurality of benches arranged to draw an arc in a top view, a plurality of manipulator-type multi-articulated robots arranged inside and outside the arc for processing wood placed on the benches, a rotary tool attached to a distal end portion of each articulated robot, a gripping device attached to the distal end portion of each articulated robot for conveying wood (work), and a tool replacement table for replacing the rotary tool and the gripping device. The wood processing system processes the wood into a desired shape by assigning roles to the plurality of multi-articulated robots for gripping, conveying, diagonal hole processing, curved surface cutting processing, and curved surface polishing processing of the wood.

CITATION LIST

Patent Literature

Patent Document 1: JP2015-102918A
Patent Document 2: JP2007-152502A

SUMMARY

Technical Problem

However, in the wood processing system described in Patent Document 1, since the number of types of processing that can be performed by each processing machine is small and each processing machine has a low degree of freedom, it may be difficult to process wood into a complicated shape or to cope with multi-product small-quantity production. Further, in the wood processing system described in Patent Document 1, since it is necessary to include the plurality of processing machines and the plurality of line conveyors, there is a possibility that the system is enlarged, complicated, and expensive.

In addition, in the wood processing system described in Patent Document 2, the plurality of benches are arranged to draw an arc in a top view. Therefore, when the wood to be processed is long, it may be difficult to perform processing with the wood placed on the benches. Further, in the wood processing system described in Patent Document 2, when the wood to be processed is long, all the wood does not fall within the movable range of the multi-articulated robot. For this reason, it is necessary to move the wood a plurality of times by the multi-articulated robot when processing the wood, and thus there is a possibility that the wood cannot be efficiently processed.

In view of the above-described circumstances, it is an object of at least one embodiment of the present invention to provide a wood processing system capable of coping with multi-product small-quantity production, efficiently processing wood including long wood, and preventing increase in size, complexity, and cost of the system.

Solution to Problem (1) A wood processing system according to at least one embodiment of the present invention includes a wood conveying device having a longitudinal direction along one direction in the horizontal direction and being capable of conveying wood along the longitudinal direction; a multi-axis processing machine arranged on one side in the longitudinal direction of the wood conveying device, the multi-axis processing machine including a spindle capable of being attached with a first tool, and a spindle moving device having two or more linear axes perpendicular to one another and two or more rotational axes for moving the spindle; and at least one multi-articulated robot arranged along the wood conveying device on the other side in the longitudinal direction of the wood conveying device, the at least one multi-articulated robot including a wrist capable of being attached with a tool unit including a second tool, and an arm having six or more rotational axes for moving the wrist.

According to the configuration described above as (1), the multi-axis processing machine includes the spindle capable of being attached with the first tool, and the spindle moving device having two or more linear axes perpendicular to one another and two or more rotational axes for moving spindle. Accordingly, the first tool attached to the spindle can be moved relative to the wood by the spindle moving along the two or more linear axes perpendicular to one another and rotating about the two or more rotational axes. The multi-articulated robot includes the wrist capable of being attached with the tool unit including the second tool and the arm having the six or more rotational axes for moving the wrist. Accordingly, the tool unit including the second tool attached to the wrist can be moved relative to the wood by rotating the wrist about the six or more rotational axes. Therefore, the multi-axis processing machine and the multi-articulated robot described above can perform various types of processing by replacing the tools, and can process the wood into a complicated shape. Therefore, it is possible to cope with multi-product small-quantity production.

In general, the multi-axis processing machine has an advantage that the absolute positioning accuracy is higher than that of the multi-articulated robot in which stiffness is low, deflection occurs, and slight errors between joints are accumulated. In general, the multi-articulated robot has an advantage that the degree of freedom of the position and posture of the tool is higher than that of the multi-axis processing machine. Since the wood processing system includes both the multi-axis processing machine and the multi-articulated robot, the multi-axis processing machine and the multi-articulated robot can share roles, for example, as causing the multi-axis processing machine having high rigidity and absolute positioning accuracy to perform cutting or drilling. Thus, it is possible to perform processing utilizing the advantages of the multi-axis processing machine and the multi-articulated robot described above.

The wood processing system includes the wood conveying device capable of conveying the wood along the longitudinal direction, the multi-axis processing machine is arranged on one side in the longitudinal direction of the wood conveying device, and the multi-articulated robot is arranged on the other side in the longitudinal direction of the wood conveying device along the wood conveying device. The multi-axis processing machine is capable of performing various processing by replacing the first tool, and the multi-articulated robot is capable of performing various processing by replacing the second tool or the tool unit. The wood processing system described above can prevent increase in size, complexity, and cost of the system. Further, since the wood including long wood conveyed by the wood conveying device can be processed by the multi-axis processing machine and the multi-articulated robot, the wood processing system can efficiently process the wood including long wood.

(2) In some embodiments, in the configuration described above as (1), the at least one multi-articulated robot includes a first multi-articulated robot and a second multi-articulated robot arranged on a side opposite to the first multi-articulated robot across the wood conveying device.

According to the configuration described above as (2), in the wood processing system, since the first multi-articulated robot and the second multi-articulated robot are arranged with the wood conveying device interposed therebetween, it is possible to prevent increase in size of the wood processing system. Further, since the first multi-articulated robot and the second multi-articulated robot are arranged with the wood conveying device interposed therebetween, it is possible to prevent a wrist and an arm of the first multi-articulated robot or the second multi-articulated robot from being in unstable posture when processing the wood conveyed by the wood conveying device. Therefore, it is possible to prevent decrease in processing accuracy of the wood by the first multi-articulated robot or the second multi-articulated robot.

(3) In some embodiments, in the configuration described above as (1) or (2), the wood processing system further includes a multi-articulated robot conveying device capable of conveying the at least one multi-articulated robot along the longitudinal direction of the wood conveying device.

According to the configuration described above as (3), since the multi-articulated robot conveying device can convey the multi-articulated robot along the longitudinal direction of the wood conveying device, it is possible to widen the range in which the wood can be processed by the multi-articulated robot. Therefore, the wood processing system can reduce the number of times of conveying the wood by the wood conveying device, and can efficiently process the wood even if the wood to be processed is long wood.

(4) In some embodiments, in the configuration described above as any one of (1) to (3), the wood processing system further includes a photographing unit capable of photographing the wood, and an image processing unit detecting positional coordinates of the wood by image-processing a photographed image photographed by the photographing unit.

According to the configuration described above as (4), since the positional coordinates of the wood can be detected by image-processing the photographed image of the wood photographed by the photographing unit by the image processing unit, the multi-axis processing machine and the multi-articulated robot can process the wood based on the detected position coordinates of the wood and the position and shape of the wood determined by the positional coordinates. Therefore, the wood processing system can improve the processing accuracy of the wood.

(5) In some embodiments, in the configuration described above as (4), the image processing unit is configured to be capable of detecting at least one of a grain and a knot of the wood by image-processing the photographed image, and at least one of the multi-axis processing machine and the multi-articulated robot performs a processing operation in accordance with a position of the grain or the knot of the wood.

According to the configuration described above as (5), the image processing unit can detect the grain or the knot of the wood by image-processing the photographed image of the wood photographed by the photographing unit. Then, the multi-axis processing machine or the multi-articulated robot can perform a processing operation in accordance with the position of the grain or the knot of the wood. The processing operation in accordance with the position of the grain or knot includes, for example, changing the position of the wood to be cut and changing the feed speed of the tool. The wood processing system described above can improve the quality of the product to be formed by processing the wood.

(6) In some embodiments, in the configuration described above as any one of (1) to (5), the wood conveying device includes a travelling rail extended along the longitudinal direction, and a bench arranged on the travelling rail and being capable of supporting the wood and reciprocating along the longitudinal direction of the travelling rail.

According to the configuration described above as (6), the wood conveying device includes the travelling rail extended along the longitudinal direction, and the bench arranged on the travelling rail and capable of supporting the wood. Since the bench can reciprocate along the longitudinal direction of the travelling rail, the wood can be caused to reciprocate along the longitudinal direction of the travelling rail. Therefore, since the wood can be moved between the multi-axis processing machine and the multi-articulated robot by the wood conveying device, it is possible to subdivide the role sharing of the processing of the wood between the multi-axis processing machine and the multi-articulated robot. Therefore, since the multi-axis processing machine and the multi-articulated robot can perform appropriate processing, it is possible to improve the quality of the product.

(7) In some embodiments, in the configuration described above as (6), the two or more linear axes of the spindle moving device include a horizontal linear axis extended along the horizontal direction perpendicular to the longitudinal direction of the wood conveying device, and a vertical linear axis extended along the vertical direction.

According to the configuration described above as (7), the two or more linear axes of the multi-axis processing machine include the horizontal linear axis extended along the horizontal direction perpendicular to the longitudinal direction of the wood conveying device, and the vertical linear axis extended along the vertical direction. Then, in the wood conveying device, the bench can reciprocate along the longitudinal direction of the travelling rail. Accordingly, the wood processing system including the multi-axis processing machine and the wood conveying device can move the spindle relative to the wood with respect to the three or more linear axes and the two or more rotational axes. Therefore, it is possible to increase the degree of freedom of processing the wood by the multi-axis processing machine.

(8) In some embodiments, in the configuration described above as any one of (1) to (7), the multi-axis processing machine further includes a pair of columns erected along a direction perpendicular to the longitudinal direction of the wood conveying device as being apart from each other across the wood conveying device, and the spindle moving device of the multi-axis processing machine includes a cross rail supported by the pair of columns as being extended over the pair of columns, and a spindle supporting portion supporting the spindle as being supported by the cross rail.

According to the configuration described above as (8), the multi-axis processing machine includes the pair of columns. The spindle moving device includes the cross rail which is supported by the pair of columns as being extended over the pair of columns, and the spindle supporting portion supporting the spindle and supported by the cross rail. Thus, the spindle is supported by the spindle moving device and the pair of columns to be movable relative to the wood. Further, since the pair of columns are erected apart from each other across the wood conveying device along the direction perpendicular to the longitudinal direction of the wood conveying device, the rigidity of the multi-axis processing machine can be improved as compared with the case of supporting with one column. The multi-axis processing machine described above can widen the movable range of the spindle and the processing range of the wood by the spindle, and thus can process long wood. Further, since the pair of columns are arranged across the wood conveying device along the direction perpendicular to the longitudinal direction of the wood conveying device and the space in the horizontal direction can be effectively utilized, it is possible to prevent increase in size of the wood processing system.

(9) In some embodiments, in the configuration described above as any one of (1) to (8), the multi-articulated robot further includes a robot base to be placed on a grounding surface, and the arm supports the wrist as being supported by the robot base.

According to the configuration described above as (9), the multi-articulated robot includes the robot base placed on a grounding surface, and the arm of the multi-articulated robot is supported by the robot base and supports the wrist. Thus, the wrist is supported by the arm and the robot base to be movable relative to the wood.

(10) In some embodiments, in the configuration described above as any one of (1) to (9), the wood processing system further includes a tool replacing unit capable of replacing the first tool as including a first tool magazine capable of accommodating the first tool.

According to the configuration described above as (10), since the wood processing system includes the tool replacing unit capable of replacing the first tool as including the first tool magazine capable of accommodating the first tool, the multi-axis processing machine facilitates replacing the first tool and enables to efficiently process the wood.

(11) In some embodiments, in the configuration described above as any one of (1) to (10), the wood processing system further includes a second tool magazine capable of accommodating the second tool.

According to the configuration described above as (11), since the wood processing system includes the second tool magazine capable of accommodating the second tool, the multi-articulated robot facilitates replacing the second tool and enables to efficiently process the wood.

Advantageous Effects

According to at least one embodiment of the present invention, there is provided a wood processing system capable of coping with multi-product small-quantity production, efficiently processing wood including long wood, and preventing increase in size, complexity, and cost of the system.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For example, an expression of relative or absolute arrangement such as "in a direction", "along a direction", "parallel", "perpendicular", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For example, an expression of an equal state such as "same", "equal" and "uniform" shall not be construed as indicating only the state in which the feature is strictly equal, but also includes a state in which there is a tolerance or a difference that can still achieve the same function.

Further, for example, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
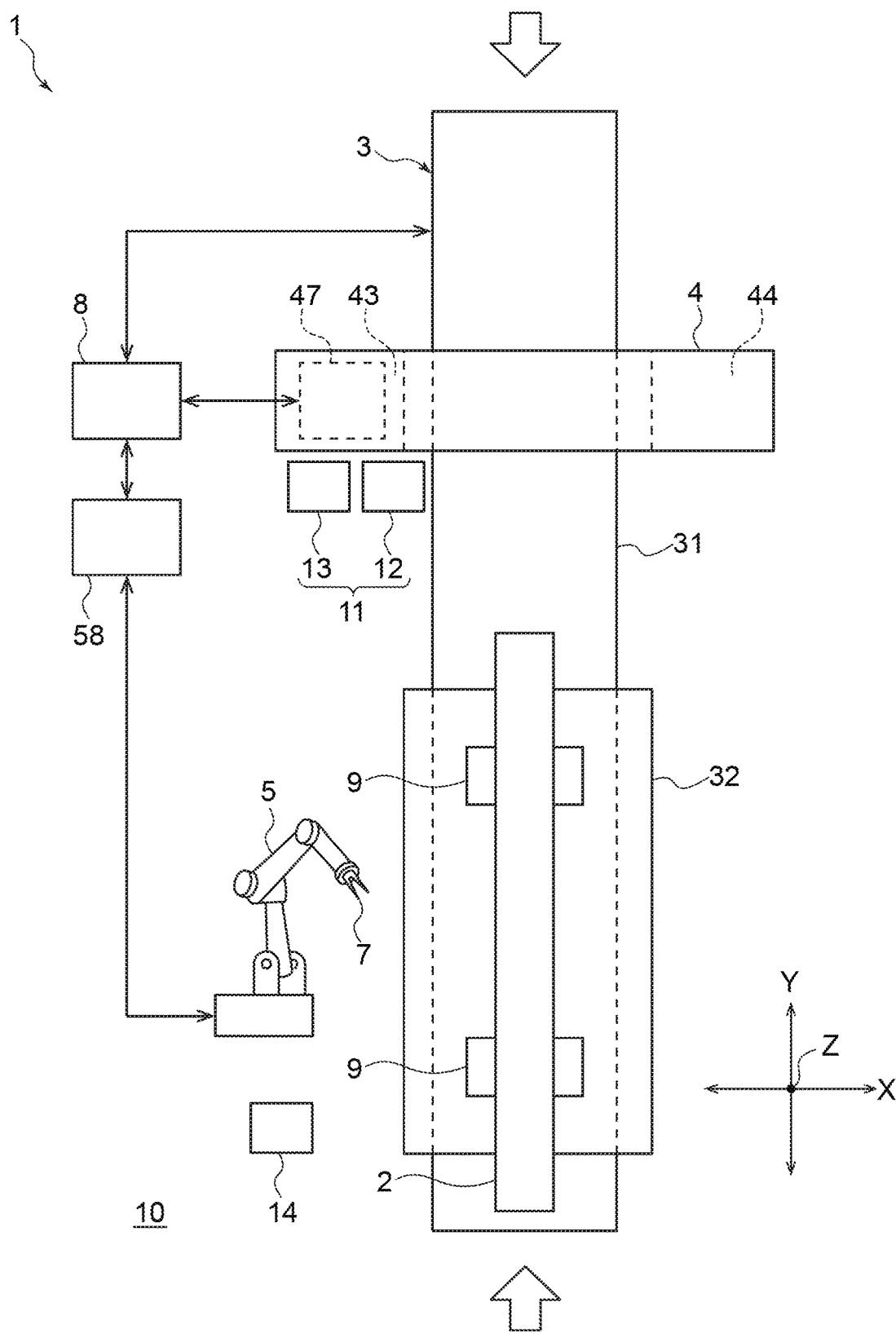
FIG. 1 is a schematic configuration diagram for explaining a wood processing system according to an embodiment of the present invention.
Figure 5:
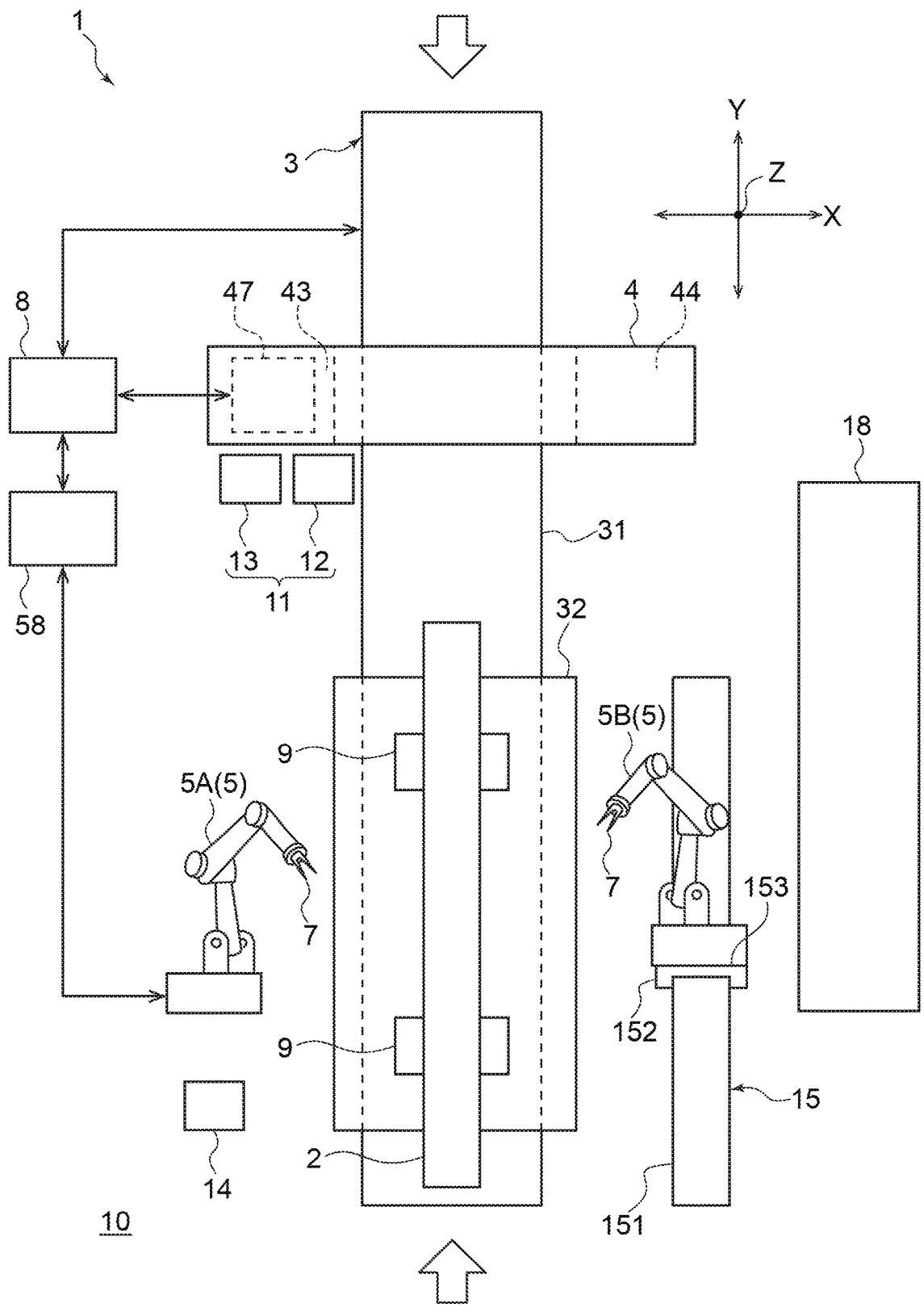
FIG. 5 is a schematic configuration diagram for explaining a wood processing system according to another embodiment of the present invention as a schematic configuration diagram of the wood processing system including a plurality of multi-articulated robots and a multi-articulated robot conveying device.
Figure 6:
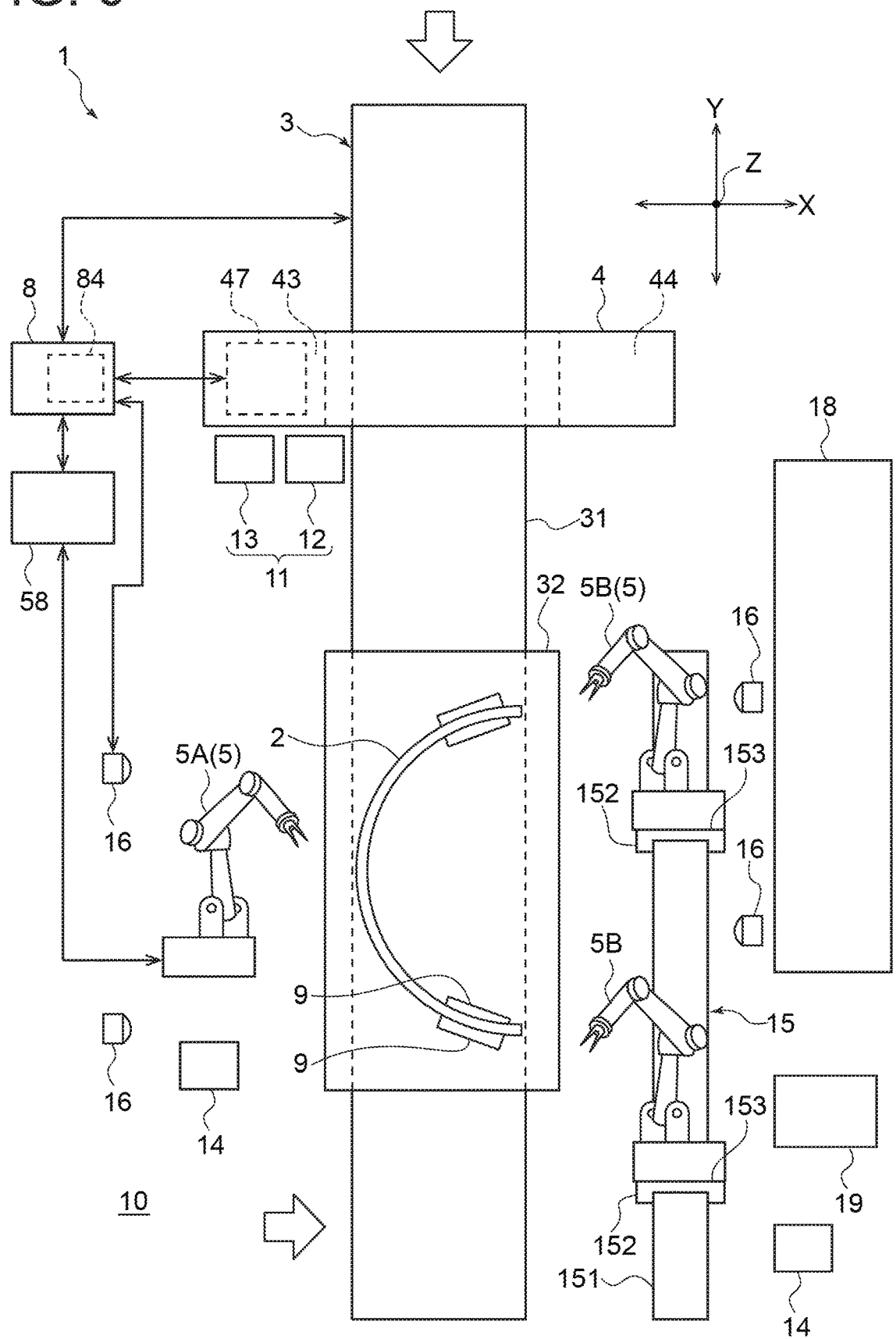
FIG. 6 is a schematic configuration diagram for explaining a wood processing system according to another embodiment of the present invention as a schematic configuration diagram of the wood processing system including a multi-articulated robot conveying device for conveying a plurality of articulated robots and a photographing unit.

FIGS. 1, 5, and 6 are schematic configuration diagrams for illustrating a wood processing system according to an embodiment of the present invention. FIG. 5 is a schematic configuration diagram of a wood processing system including a plurality of multi-articulated robots and a multi-articulated robot conveying device. FIG. 6 is a schematic configuration diagram of a wood processing system including a multi-articulated robot conveying device for conveying the plurality of multi-articulated robots and a photographing unit.

As illustrated in FIGS. 1, 5, and 6, the wood processing system 1 according to some embodiments includes a wood conveying device 3 having a longitudinal direction along one direction in the horizontal direction, a multi-axis processing machine 4 arranged on one side in the longitudinal direction of the wood conveying device 3, and at least one multi-articulated robot 5 arranged along the wood conveying device 3 on the other side in the longitudinal direction of the wood conveying device 3.

A machine coordinate system having a predetermined position as an origin is set in each of the wood conveying device 3, the multi-axis processing machine 4, the multi-articulated robot 5, and the multi-articulated robot conveying device 15 to be described later. That is, an X-axis, a Y-axis, and a Z-axis perpendicular to one another in the machine coordinate system are determined in advance. Hereinafter, the longitudinal direction of the wood conveying device 3 (vertical direction in FIGS. 1, 5, and 6) is defined as the Y-axis, and a horizontal direction perpendicular to the longitudinal direction of the wood conveying device 3 (horizontal direction in FIGS. 1, 5, and 6) is defined as the X-axis. A vertical direction, that is, a direction perpendicular to the X-axis and the Y-axis is defined as the Z-axis.

Figure 2:
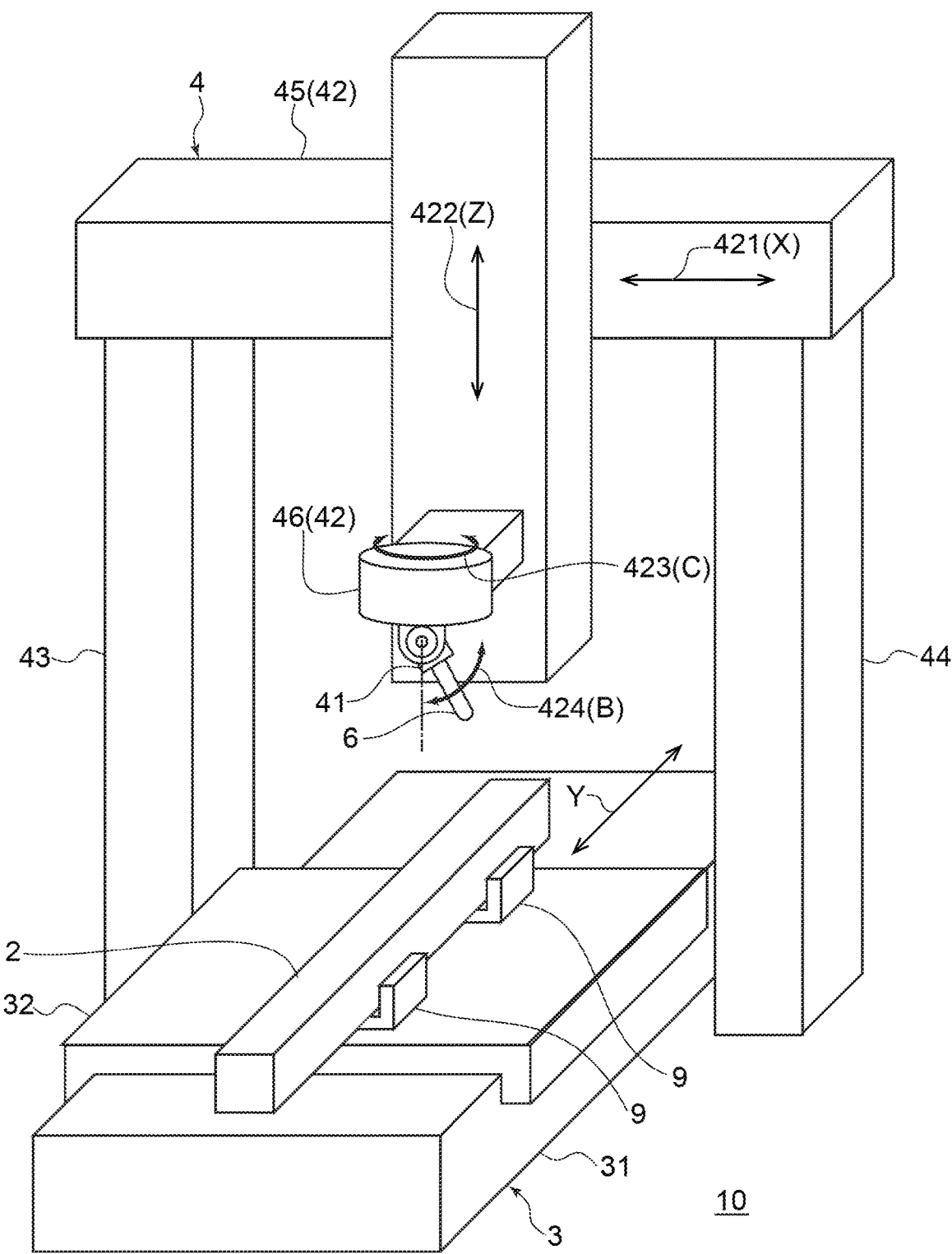
FIG. 2 is a schematic perspective view of a wood conveying device and a multi-axis processing machine according to an embodiment of the present invention.

The wood conveying device 3 is configured to be capable of conveying the wood 2 along the longitudinal direction (Y-axis) of the wood conveying device 3 as illustrated in FIGS. 1, 2, 5, and 6. Here, FIG. 2 is a schematic perspective view of a wood conveying device and a multi-axis processing machine according to an embodiment of the present invention. The wood conveying device 3 includes a travelling rail 31 extended along the longitudinal direction and a bench 32 arranged on the travelling rail 31 and being capable of reciprocating along the longitudinal direction of the travelling rail 31, as illustrated in FIGS. 1, 2, 5, and 6. Further, the travelling rail 31 is installed on a floor surface 10. The bench 32 is configured to support the wood 2. In the embodiment illustrated in FIGS. 1, 2, 5, and 6, the bench 32 supports the wood 2 by securing the wood 2 with four L-shaped wood supporting members 9 secured to the top surface of the bench 32. The wood conveying device 3 further includes a drive unit including a linear servomotor (not illustrated). By driving the linear servomotor by the drive unit, the wood conveying device 3 can cause the bench 32 to reciprocate along the longitudinal direction of the travelling rail 31.

Arrows in the vicinity of both ends in the longitudinal direction of the wood conveying device 3 in FIGS. 1, 5, and 6 illustrate a direction in which the wood 2 is carried in, and the wood 2 is carried in from above or below in the drawings. The wood 2 includes a woody material which is a material in which wood is artificially reconstituted. More specifically, the wood 2 includes veneer, veneer laminated wood, laminated wood, solid wood, plywood, composite wood having a layered combination of the above, or jointly-bonded wood. Incidentally, the wood 2 may be elongated wood (square wood) having a longitudinal direction along the Y-axis as illustrated in FIGS. 1, 2, and 5, a curved material as illustrated in FIG. 6, or a material having another shape such as a round member or a plate-shaped member.

As illustrated in FIG. 2, the multi-axis processing machine 4 includes a spindle 41 capable of being attached with a first tool 6, and a spindle moving device 42 having two or more linear axes (a first linear axis 421 and a second linear axis 422) perpendicular to one another and two or more rotational axes (a first rotational axis 423 and a second rotational axis 424) for moving the spindle 41. In the multi-axis processing machine 4 described above, the spindle 41 moves along the two or more linear axes perpendicular to one another, and rotates about two or more rotational axes, so that the first tool 6 attached to the spindle 41 can be moved relative to the wood 2 conveyed by the wood conveying device 3, and the first tool 6 can be brought into contact with an arbitrary point of the wood 2 at an arbitrary angle.

More specifically, the spindle moving device 42 further includes a drive unit including two or more linear servomotors (not illustrated), and the drive unit can drive the linear servomotors to move the spindle 41 relative to the wood 2 along the two or more linear axes.

Further, the spindle moving device 42 includes a drive unit including two or more servomotors (not illustrated), and the drive unit can drive the servomotors to rotate the spindle 41 relative to the wood 2 about two or more rotational axes. In the embodiment illustrated in FIG. 2, the two or more rotational axes of the spindle moving device 42 includes a C-axis rotating about the Z-axis and a B-axis rotating about the Y-axis.

The first tool 6 includes a machining tool such as an end mill, a drill, a milling cutter, and a cutting tool, and a polishing tool such as a grindstone. The first tool 6 attached to the spindle 41 moves relative to the wood 2 together with the spindle 41 and processes the wood 2 while rotating together with the spindle 41.

Figure 3:
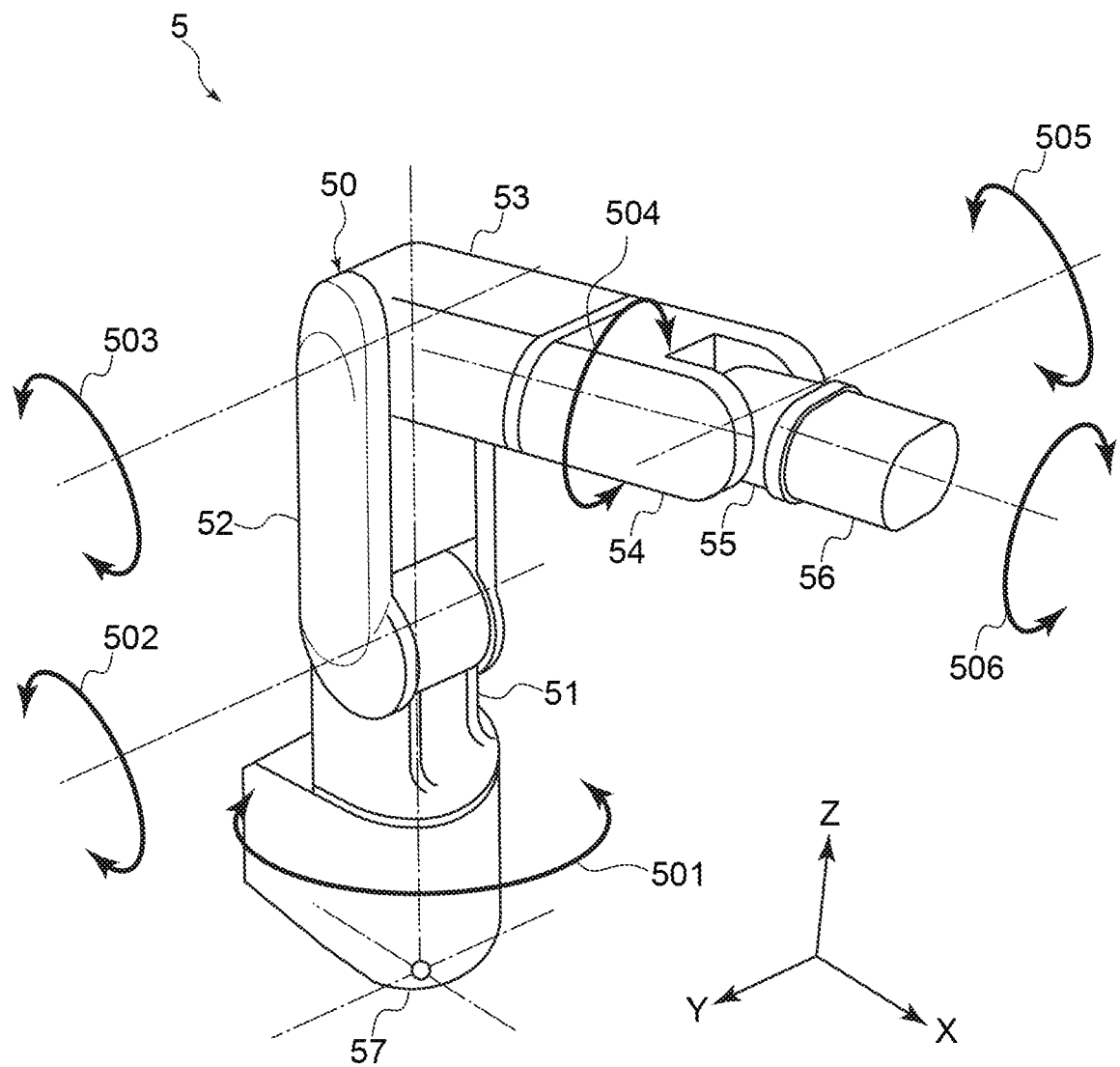
FIG. 3 is a schematic perspective view of a multi-articulated robot according to an embodiment of the present invention.
Figure 4:
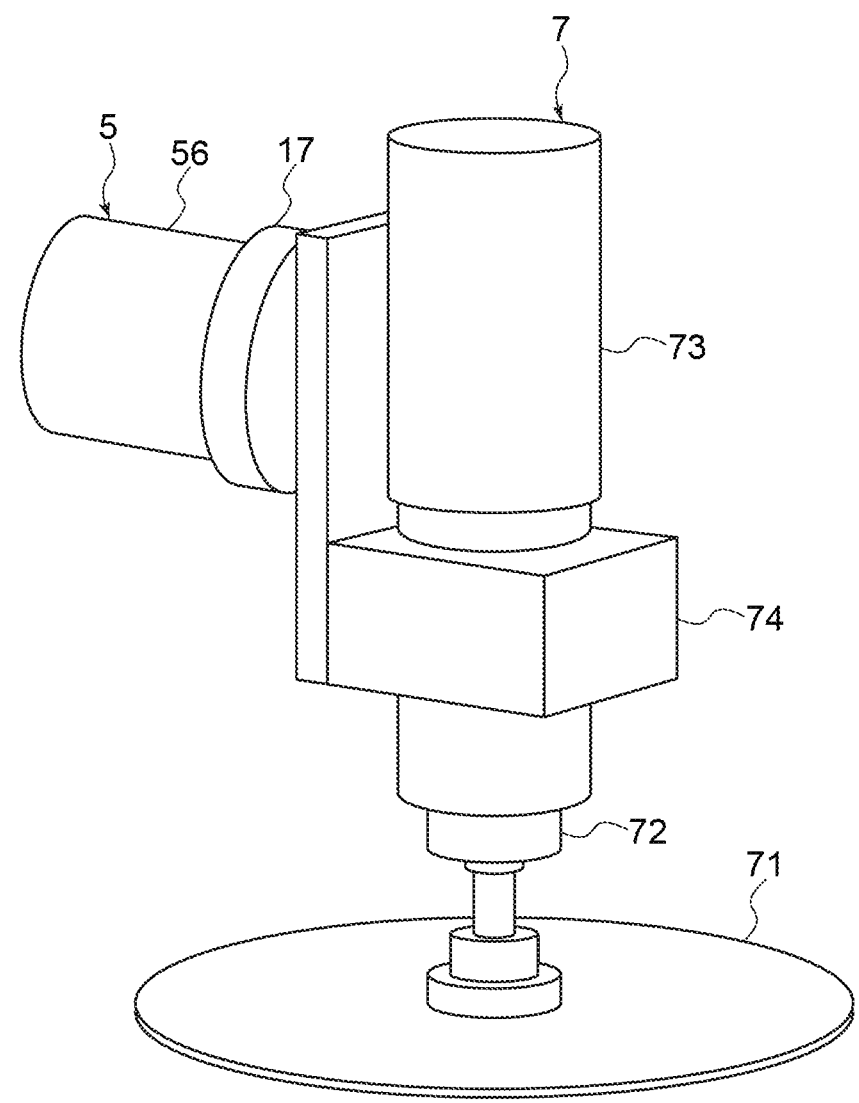
FIG. 4 is a schematic perspective view for explaining a tool unit attached to a wrist of the multi-articulated robot illustrated in FIG. 3.

As illustrated in FIGS. 3 and 4, the multi-articulated robot 5 includes a wrist 56 capable of being attached with a tool unit 7 including a second tool 71, and an arm 50 having six or more rotational axes for moving the wrist 56. Here, FIG. 3 is a schematic perspective view of a multi-articulated robot in an embodiment of the present invention. FIG. 4 is a schematic perspective view for explaining the tool unit attached to the wrist of the multi-articulated robot illustrated in FIG. 3. When the wrist 56 rotates about the six or more rotational axes, the multi-articulated robot 5 can move the tool unit 7 including the second tool 71 attached to the wrist 56 relative to the wood 2 conveyed by the wood conveying device 3, and the second tool 71 can be brought into contact with an arbitrary point of the wood 2 at an arbitrary angle.

More specifically, the multi-articulated robot 5 further includes a drive unit including six or more servomotors (not illustrated), and the drive unit can drive the servomotors to move the wrist 56 relative to the wood 2 about the six or more rotational axes.

As illustrated in FIG. 4, the tool unit 7 includes the second tool 71, the spindle 72 capable of being attached with the second tool 71, a drive unit 73 including a motor for rotationally driving the spindle 72, and a holder 74 which is configured to support the spindle 72 and the drive unit 73 and to be capable of being attached to the wrist 56. The second tool 71 includes a machining tool such as an end mill, a drill, a milling cutter, and a cutting tool, and a polishing tool such as a grindstone. The second tool 71 attached to the spindle 72 moves together with the wrist 56 relative to the wood 2, and is driven by the drive unit 73 to process the wood 2 while rotating together with the spindle 72.

As described above, the wood processing system 1 according to some embodiments includes the wood conveying device 3 described above, the multi-axis processing machine 4 including the spindle 41 and the spindle moving device 42 described above, and the multi-articulated robot 5 including the wrist 56 and the arm 50 described above, as illustrated in FIGS. 1, 5, and 6.

According to the above configuration, as illustrated in FIG. 2, the multi-axis processing machine 4 includes the spindle 41 capable of being attached with the first tool 6, and the spindle moving device 42 having two or more linear axes (the first linear axis 421 and the second linear axis 422) perpendicular to one another and two or more rotational axes (the first rotational axis 423 and the second rotational axis 424) for moving the spindle 41. Accordingly, the first tool 6 attached to the spindle 41 can be moved relative to the wood 2 by the spindle 41 moving along the two or more linear axes perpendicular to one another and rotating about the two or more rotational axes. As illustrated in FIGS. 3 and 4, the multi-articulated robot 5 includes the wrist 56 capable of being attached with the tool unit 7 including the second tool 71 and the arm 50 having the six or more rotational axes (a first rotational axis 501 to a sixth rotational axis 506) for moving the wrist 56. Accordingly, the tool unit 7 including the second tool 71 attached to the wrist 56 can be moved relative to the wood 2 by rotating the wrist 56 about the six or more rotational axes. Therefore, the multi-axis processing machine 4 and the multi-articulated robot 5 described above can perform various types of processing by replacing the tools (the first tool 6, the second tool 71, and the tool unit 7), and can process the wood 2 into a complicated shape. Therefore, it is possible to cope with multi-product small-quantity production.

In general, the multi-axis processing machine 4 has an advantage that the absolute positioning accuracy is higher than that of the multi-articulated robot 5 in which stiffness is low, deflection occurs, and slight errors between joints are accumulated. In general, the multi-articulated robot 5 has an advantage that the degree of freedom of the position and posture of the tool is higher than that of the multi-axis processing machine 4. Since the wood processing system 1 includes both the multi-axis processing machine 4 and the multi-articulated robot 5, the multi-axis processing machine 4 and the multi-articulated robot 5 can share roles, for example, as causing the multi-axis processing machine 4 having high rigidity and absolute positioning accuracy to perform cutting or drilling. Thus, it is possible to perform processing utilizing the advantages of the multi-axis processing machine 4 and the multi-articulated robot 5 described above.

The wood processing system 1 includes the wood conveying device 3 capable of conveying the wood 2 along the longitudinal direction, the multi-axis processing machine 4 is arranged on one side in the longitudinal direction of the wood conveying device 3, and the multi-articulated robot 5 is arranged on the other side in the longitudinal direction of the wood conveying device 3 along the wood conveying device 3. The multi-axis processing machine 4 is capable of performing various processing by replacing the first tool 6, and the multi-articulated robot 5 is capable of performing various processing by replacing the second tool 71 or the tool unit 7. The wood processing system 1 described above can prevent increase in size, complexity, and cost of the system. Further, since the wood 2 including long wood conveyed by the wood conveying device 3 can be processed by the multi-axis processing machine 4 and the multi-articulated robot 5, the wood processing system 1 can efficiently process the wood 2 including long wood.

In some embodiments, as illustrated in FIGS. 5 and 6, at least one multi-articulated robot 5 described above includes a first multi-articulated robot 5A and a second multi-articulated robot 5B arranged on a side opposite to the first multi-articulated robot 5A across the wood conveying device 3. In the embodiment illustrated in FIGS. 5 and 6, the first multi-articulated robot 5A is arranged on one side (the left side in the drawing) in the horizontal direction (X-axis) perpendicular to the longitudinal direction of the wood conveying device 3 away from the wood conveying device 3, and the second multi-articulated robot 5B is arranged on the other side (the right side in the drawing) in the horizontal direction (X-axis) perpendicular to the longitudinal direction of the wood conveying device 3 away from the wood conveying device 3.

According to the above configuration, in the wood processing system 1, since the first multi-articulated robot 5A and the second multi-articulated robot 5B are arranged with the wood conveying device 3 interposed therebetween, it is possible to prevent increase in size of the wood processing system 1. Further, since the first multi-articulated robot 5A and the second multi-articulated robot 5B are arranged with the wood conveying device 3 interposed therebetween, it is possible to prevent the wrist 56 and the arm 50 of the first multi-articulated robot 5A or the second multi-articulated robot 5B from being in unstable posture when processing the wood 2 conveyed by the wood conveying device 3. Therefore, it is possible to prevent decrease in processing accuracy of the wood 2 by the first multi-articulated robot 5A or the second multi-articulated robot 5B.

In some embodiments, as illustrated in FIGS. 5 and 6, the wood processing system 1 described above further includes a multi-articulated robot conveying device 15 capable of conveying at least one multi-articulated robot 5 along the longitudinal direction (Y-axis) of the wood conveying device 3. As illustrated in FIGS. 5 and 6, the multi-articulated robot conveying device 15 includes a robot conveying rail 151 extended along the longitudinal direction of the wood conveying device 3 and arranged side by side with the travelling rail 31, and a robot conveying table 152 arranged on the robot conveying rail 151 and being capable of reciprocating along the longitudinal direction of the robot conveying rail 151. Further, the robot conveying rail 151 is installed on the floor surface 10. The robot conveying table 152 is configured to be capable of securing the multi-articulated robot 5 on an upper surface 153 thereof.

The multi-articulated robot conveying device 15 further includes a drive unit including a linear servomotor (not illustrated). By driving the linear servomotor by the drive device, the multi-articulated robot conveying device 15 can cause the robot conveying table 152 to reciprocate along the longitudinal direction of the robot conveying rail 151. In the embodiment illustrated in FIG. 5, in the multi-articulated robot conveying device 15, one robot conveying table 152 is arranged on one robot conveying rail 151. In the embodiment illustrated in FIG. 6, in the multi-articulated robot conveying device 15, two robot conveying tables 152 are arranged on one robot conveying rail 151.

According to the above-described configuration, since the multi-articulated robot conveying device 15 can convey the multi-articulated robot 5 along the longitudinal direction of the wood conveying device 3, it is possible to widen the range in which the wood 2 can be processed by the multi-articulated robot 5. Therefore, the wood processing system 1 can reduce the number of times of conveying the wood 2 by the wood conveying device 3, and can efficiently process the wood 2 even if the wood 2 to be processed is long wood.

In some embodiments, as illustrated in FIG. 6, the wood processing system 1 described above includes a photographing unit 16 capable of photographing the wood 2 and an image processing unit 84. The photographing unit 16 photographs the wood 2 and generates a photographed image. Further, the image processing unit 84 is configured to be capable of detecting position coordinates of the wood 2 by performing image processing such as edge detection in which the boundary of the wood 2 is found from the density change, for example, on the photographed image photographed by the photographing unit 16. As illustrated in FIG. 6, the plurality of photographing units 16 are arranged at positions away from the travelling rail 31 in the horizontal direction (X-axis) perpendicular to the longitudinal direction of the wood conveying device 3 as being apart from each other in the longitudinal direction of the wood conveying device 3. As illustrated in FIG. 6, some of the plurality of photographing units 16 are arranged on a side (the left side in the drawing) opposite to the travelling rail 31 across the first multi-articulated robot 5A, and some of the plurality of photographing units 16 are arranged on a side (the right side in the drawing) opposite to the travelling rail 31 across the second multi-articulated robot 5B or the robot conveying rail 151.

According to the above-described configuration, since the positional coordinates of the wood 2 can be detected by image-processing the photographed image of the wood 2 photographed by the photographing unit 16 by the image processing unit 84, the multi-axis processing machine 4 and the multi-articulated robot 5 can process the wood 2 based on the detected position coordinates of the wood 2 and the position and shape of the wood 2 determined by the positional coordinates. Therefore, the wood processing system 1 can improve the processing accuracy of the wood 2.

Figure 8:
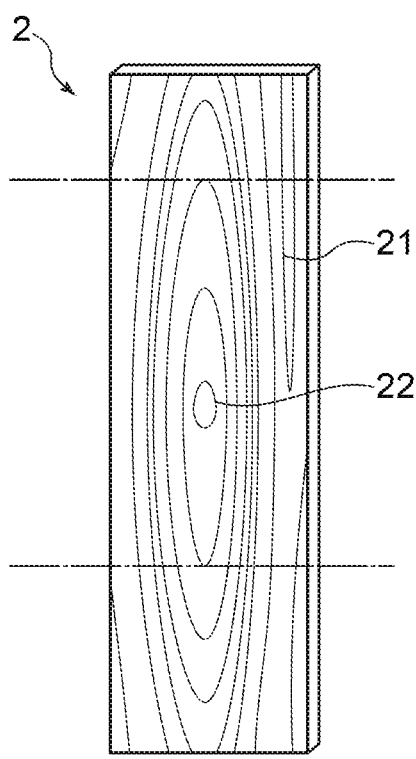
FIG. 8 is a diagram for explaining a grain and a knot of wood detected by an image processing unit according to an embodiment of the present invention as a schematic perspective view of the wood photographed by a photographing unit.

In some embodiments, the image processing unit 84 described above is configured to detect at least one of a grain 21 and a knot 22 of the wood 2 as illustrated in FIG. 8 by image-processing the photographed image of the wood 2 photographed by the photographing unit 16. Here, FIG. 8 is a diagram for explaining a grain and a knot of wood detected by the image processing unit according to an embodiment of the present invention, and is a schematic perspective view of wood photographed by the photographing unit. At least one of the above-described multi-axis processing machine 4 and the above-described multi-articulated robot 5 is configured to perform a processing operation in accordance with a position of the grain 21 or the knot 22 of the wood 2. In FIG. 8, one-dot chain lines illustrate the cutting positions of the wood 2. Here, for example, when performing cutting perpendicular to the grain 21 as illustrated in FIG. 8, the feed speed of the tools (the first tool 6 and the second tool 71) may be changed compared to the case of cutting along the grain 21. In this case, it is possible to improve the processing quality of the cut surface. Further, if the position of the hole to be formed and the position of the knot 22 overlap each other in a process after the cutting process when the wood 2 is cut at a cutting position, the multi-axis processing machine 4 or the multi-articulated robot 5 shifts the cutting position of the wood 2 upward or downward in the drawing so that the position of the hole to be formed and the position of the knot 22 do not overlap each other. In this case, since it is possible to prevent forming of an unexpectedly shaped hole to be caused by punching the knot 22, the quality of the processed product can be improved.

According to the above-described configuration, the image processing unit 84 can detect the grain 21 or the knot 22 of the wood 2 by image-processing the photographed image of the wood 2 photographed by the photographing unit 16. Then, the multi-axis processing machine 4 or the multi-articulated robot 5 can perform a processing operation in accordance with the position of the grain 21 or the knot 22 of the wood 2. The processing operation in accordance with the position of the grain 21 or knot 22 includes, for example, changing the position of the wood 2 to be cut and changing the feed speed of the tool (the first tool 6 and the second tool 71). The wood processing system 1 described above can improve the quality of the product to be formed by processing the wood 2.

In some embodiments, the multi-axis processing machine 4 described above further includes a first control unit 47 for controlling the components constituting the multi-axis processing machine 4, as illustrated in FIGS. 1, 5, and 6. Further, the multi-articulated robot 5 described above further includes a controller 58 for controlling components constituting the multi-articulated robot 5, as illustrated in FIGS. 1, 5, and 6. The wood processing system 1 further includes a second control unit 8 (controller) for controlling the wood conveying device 3, the multi-axis processing machine 4, and the multi-articulated robot 5 as illustrated in FIGS. 1, 5, and, 6. The first control unit 47 and the controller 58 include an input-output unit (input-output interface), a storage unit (ROM, RAM), a microcomputer including the arithmetic unit (CPU), and the like. Here, the general configuration and control thereof will be omitted.

As illustrated in FIGS. 1, 5, and 6, the second control unit 8 is electrically connected to the wood conveying device 3, the first control unit 47 of the multi-axis processing machine 4, and the controller 58 of the multi-articulated robot 5 and is configured to be capable of transmitting and receiving signals therebetween. Further, in the embodiment illustrated in FIGS. 5 and 6, the second control unit 8 is electrically connected to the multi-articulated robot conveying device 15 (not illustrated) and is configured to be capable of transmitting and receiving signals therebetween. In the embodiment illustrated in FIG. 6, the second control unit 8 is electrically connected to each photographing unit 16 and is configured to be capable of transmitting and receiving signals therebetween.

Figure 7:
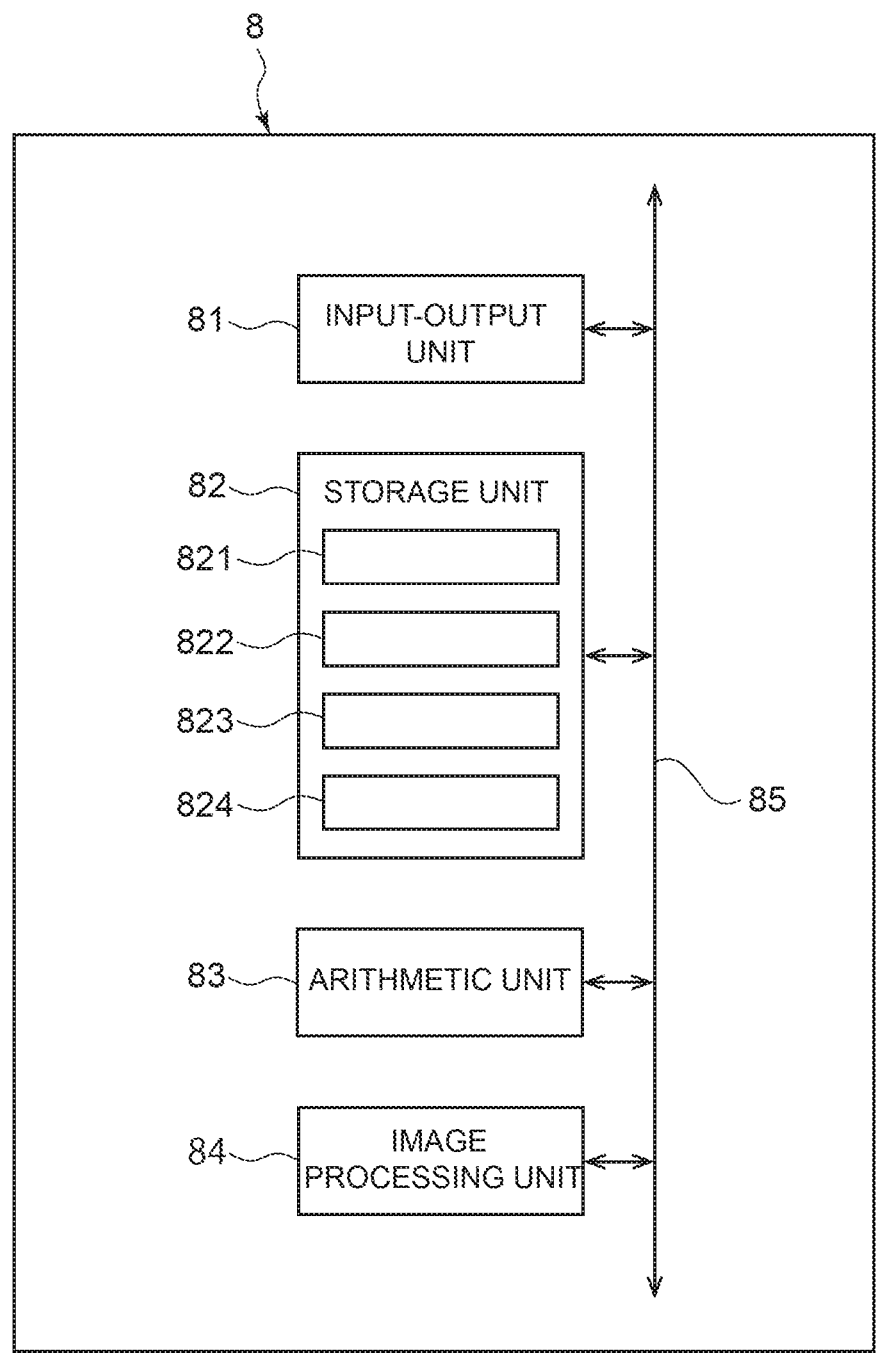
FIG. 7 is a schematic configuration diagram illustrating an example of a configuration of a control unit in a wood processing system according to an embodiment of the present invention.

As illustrated in FIG. 7, the second control unit 8 includes an input-output unit 81, a storage unit 82, an arithmetic unit 83, and the image processing unit 84 described above. In other words, the above-described functions to be performed by the image processing unit 84 are configured to be realized by the second control unit 8. Here, FIG. 7 is a schematic configuration diagram illustrating an example of a configuration of a control unit in a wood processing system according to an embodiment of the present invention. The input-output unit 81, the storage unit 82, the arithmetic unit 83, and the image processing unit 84 of the second control unit 8 are electrically connected to a bus 85, and are configured to be capable of transmitting and receiving signals therebetween.

The input-output unit 81 (input-output interface) of the second control unit 8 receives various information from the components (such as the multi-axis processing machine 4 and the multi-articulated robot 5) used in the wood processing system 1, and outputs various information based on the calculation result and the like to the respective components. The storage unit 82 (ROM, RAM) is configured to be capable of storing the input various information, various programs and operation results necessary for control implementation, and the like. The arithmetic unit 83 (CPU) performs arithmetic processing based on the various information described above. The second control unit 8 includes a microcomputer including the input-output unit 81, the storage unit 82, and the arithmetic unit 83. Here, the general configuration and control will be omitted as appropriate.

The storage unit 82 of the second control unit 8 stores wood information data 821, wood conveying device information data 822, multi-axis processing machine information data 823, and multi-articulated robot information data 824, as illustrated in FIG. 7. The wood information data 821 includes information of the wood 2, such as position, posture, shape, and material of the wood 2, and processing information for processing the wood 2 such as a processing pass. The wood conveying device information data 822 includes positional information of the bench 32 of the wood conveying device 3. The multi-axis processing machine information data 823 includes information of the first tool 6 such as the position and posture, dimensions, and cutting conditions of the first tool 6, and information of the multi-axis processing machine 4 such as the position and posture of the spindle 41 and the spindle moving device 42. The multi-articulated robot information data 824 includes information of the second tool 71 such as the position and posture, dimensions, and cutting conditions of the tool unit 7 including the second tool 71, and information of the multi-articulated robot 5 such as the position and posture of the wrist 56 and the arm 50.

The second control unit 8 controls the operation of the wood conveying device 3, the multi-axis processing machine 4, and the multi-articulated robot 5 based on the wood information data 821, the wood conveying device information data 822, the multi-axis processing machine information data 823, and the multi-articulated robot information data 824 stored in the storage unit 82. Further, the second control unit 8 determines the role sharing of the processing of the wood 2 between the multi-axis processing machine 4 and the multi-articulated robot 5 based on the wood information data 821, the wood conveying device information data 822, the multi-axis processing machine information data 823, and the multi-articulated robot information data 824 stored in the storage unit 82.

In some embodiments, as illustrated in FIGS. 1, 2, 5, and 6, the wood conveying device 3 described above includes the travelling rail 31 described above and the bench 32 described above.

According to the above-described configuration, the wood conveying device 3 includes the travelling rail 31 extended along the longitudinal direction, and the bench 32 arranged on the travelling rail 31 and capable of supporting the wood 2. Since the bench 32 can reciprocate along the longitudinal direction of the travelling rail 31, the wood 2 can be caused to reciprocate along the longitudinal direction of the travelling rail 31. Therefore, since the wood 2 can be moved between the multi-axis processing machine 4 and the multi-articulated robot 5 by the wood conveying device 3, it is possible to subdivide the role sharing of the processing of the wood 2 between the multi-axis processing machine 4 and the multi-articulated robot 5. Therefore, since the multi-axis processing machine 4 and the multi-articulated robot 5 can perform appropriate processing, it is possible to improve the quality of the product.

In some embodiments, as illustrated in FIG. 2, the two or more linear axes of the multi-axis processing machine 4 described above includes the first linear axis 421 (horizontal linear axis) extended along the horizontal direction (X-axis) perpendicular to the longitudinal direction of the wood conveying device 3, and the second linear axis 422 (vertical linear axis) extended along the vertical direction (Z-axis). Further, the wood conveying device 3 described above is capable of reciprocating along the longitudinal direction of the travelling rail 31 on the bench 32 described above, as illustrated in FIG. 2.

According to the above configuration, the two or more linear axes of the multi-axis processing machine 4 include the first linear axis 421 (horizontal linear axis) extended along the horizontal direction (X-axis) perpendicular to the longitudinal direction of the wood conveying device 3, and the second linear axis 422 (vertical linear axis) extended along the vertical direction (Z-axis). Then, in the wood conveying device 3, the bench 32 can reciprocate along the longitudinal direction (Y-axis) of the travelling rail 31. Accordingly, the wood processing system 1 including the multi-axis processing machine 4 and the wood conveying device 3 can move the spindle 41 relative to the wood 2 with respect to the three or more linear axes including the Y-axis and the two or more rotational axes of the wood conveying device 3. Therefore, it is possible to increase the degree of freedom of processing the wood 2 by the multi-axis processing machine 4.

In some embodiments, as illustrated in FIGS. 1, 2, 5, and 6, the multi-axis processing machine 4 described above further includes a pair of columns 43, 44 apart from each other across the wood conveying device 3 along the horizontal direction (X-axis) perpendicular to the longitudinal direction of the wood conveying device 3 as being erected on the floor surface 10. As illustrated in FIG. 2, the spindle moving device 42 of the multi-axis processing machine 4 described above includes a cross rail 45 which is supported by the pair of columns 43, 44 as being extended over the pair of columns 43, 44, and a spindle supporting portion 46 supporting the spindle 41 and supported by the cross rail 45.

In the embodiment illustrated in FIG. 2, the spindle supporting portion 46 has the above-described first linear axis 421 and the above-described second linear axis 422, and is configured to be capable of reciprocating along the first linear axis 421 and the second linear axis 422 with respect to the cross rail 45. In another embodiment, the cross rail 45 may include at least one of the above-described first linear axis 421 and the above-described second linear axis 422, and may be configured to be capable of reciprocating along the first linear axis 421 or the second linear axis 422 with respect to the pair of columns 43, 44. The spindle supporting portion 46 has the above-described first rotational axis 423 and the above-described second rotational axis 424, the spindle 41 is configured to be capable of rotating about the C-axis or B-axis.

According to the above configuration, the multi-axis processing machine 4 includes the pair of columns 43, 44. The spindle moving device 42 includes the cross rail 45 which is supported by the pair of columns 43, 44 as being extended over the pair of columns 43, 44, and the spindle supporting portion 46 supporting the spindle 41 and supported by the cross rail 45. Thus, the spindle 41 is supported by the spindle moving device 42 and the pair of columns 43, 44 to be movable relative to the wood 2. Further, since the pair of columns 43, 44 are erected apart from each other across the wood conveying device 3 along the direction perpendicular to the longitudinal direction of the wood conveying device 3, the rigidity of the multi-axis processing machine 4 can be improved as compared with the case of supporting with one column 43, 44. The multi-axis processing machine 4 described above can widen the movable range of the spindle 41 and the processing range of the wood 2 by the spindle 41, and thus can process long wood 2. Further, since the pair of columns 43, 44 are arranged across the wood conveying device 3 along the direction perpendicular to the longitudinal direction of the wood conveying device 3 and the space in the horizontal direction can be effectively utilized, it is possible to prevent increase in size of the wood processing system 1.

In some embodiments, as illustrated in FIG. 3, the multi-articulated robot 5 described above further includes a robot base 57 to be placed on an installation surface (a floor surface 10 or an upper surface 153 of the multi-articulated robot conveying device 15). Then, the arm 50 of the multi-articulated robot 5 is supported by the robot base 57 and is adapted to support the wrist 56. In other words, as illustrated in FIG. 3, the multi-articulated robot 5 includes the robot base 57, the arm 50 described above axially supported by the robot base 57, and the wrist 56 described above axially supported by the arm 50. As illustrated in FIG. 3, the arm 50 includes a first arm 51, a second arm 52, a third arm 53, a fourth arm 54 and a fifth arm 55 in order from the robot base 57 side.

The first arm 51 is axially supported, at one side thereof in the axial direction, by the robot base 57. The first arm 51 is driven by a drive unit including a servomotor (not illustrated) to rotate about a first rotational axis 501 arranged between the first arm 51 and the robot base 57.

The second arm 52 is axially supported, at one side thereof in the axial direction, by the first arm 51 at the other side thereof in the axial direction. The second arm 52 is driven by a drive unit including a servomotor (not illustrated) to rotate about the second rotational axis 502 arranged between the first arm 51 and the second arm 52, thereby changing an angle formed by the axial direction of the first arm 51 and the axial direction of the second arm 52.

The third arm 53 is axially supported, at one side thereof in the axial direction, by the second arm 52 at the other side thereof in the axial direction. The third arm 53 is driven by a drive unit including a servomotor (not illustrated) to rotate about the third rotational axis 503 arranged between the second arm 52 and the third arm 53, thereby changing an angle formed by the axial direction of the second arm 52 and the axial direction of the third arm 53. The fourth arm 54, the axial direction of which is along the axial direction of the third arm 53, is axially supported, at one side thereof in the axial direction, by the third arm 53 at the other side thereof in the axial direction. The fourth arm 54 is driven by a drive unit including a servomotor (not illustrated) to rotate about the fourth rotational axis 504 arranged between the third arm 53 and the fourth arm 54.

The fifth arm 55 is axially supported, at one side thereof in the axial direction, by the fourth arm 54 at the other side thereof in the axial direction. The fifth arm 55 is driven by a drive unit including a servomotor (not illustrated) to rotate about the fifth rotational axis 505 arranged between the fourth arm 54 and the fifth arm 55, thereby changing an angle formed by the axial direction of the fourth arm 54 and the axial direction of the fifth arm 55. The wrist 56, the axial direction of which is along the axial direction of the fifth arm 55, is axially supported, at one side thereof in the axial direction, by the fifth arm 55 at the other side thereof in the axial direction. The wrist 56 is driven by a drive unit including a servomotor (not illustrated) to rotate about the sixth rotational axis 506 arranged between the fifth arm 55 and the wrist 56.

According to the above configuration, the multi-articulated robot 5 includes the robot base 57 placed on a grounding surface (the floor surface 10 or the upper surface 153 of the multi-articulated robot conveying device 15), and the arm 50 of the multi-articulated robot 5 is supported by the robot base 57 and supports the wrist 56. Thus, the wrist 56 is supported by the arm 50 and the robot base 57 to be movable relative to the wood 2.

In some embodiments, as illustrated in FIGS. 1, 5, and 6, the wood processing system 1 described above further includes a tool replacing unit 11 capable of replacing the first tool 6 as including a first tool magazine 12 capable of accommodating the first tool 6. In the embodiment illustrated in FIGS. 1, 5, and 6, the tool replacing unit 11 includes the first tool magazine 12 and a tool changer 13 having a detaching-attaching mechanism capable of causing the first tool 6 to be detachably attachable to the spindle 41 of the multi-axis processing machine 4 or the first tool magazine 12. Since the first tool magazine 12 has the same configuration as a second tool magazine 14 illustrated in FIG. 9 to be described later, description thereof will be omitted. The tool changer 13 includes a drive source such as a motor (not illustrated) and an actuator, including a tool grip portion (not illustrated) and the like, being operated by the drive source, so that the first tool 6 can be attached to the spindle 41 of the multi-axis processing machine 4 or the first tool magazine 12, and the first tool 6 can be detached from the spindle 41 of the multi-axis processing machine 4 or the first tool magazine 12. Here, if the first tool magazine 12 is located within the movable range of the spindle 41 of the multi-axis processing machine 4 and the first tool 6 can be attached directly to the spindle 41 from the first tool magazine 12, the first tool magazine 12 may not be included in the tool replacing unit 11.

According to the above-described configuration, since the wood processing system 1 includes the tool replacing unit 11 capable of replacing the first tool 6 as including the first tool magazine 12 capable of accommodating the first tool 6, the multi-axis processing machine 4 facilitates replacing the first tool 6 and enables to efficiently process the wood 2.

Figure 9:
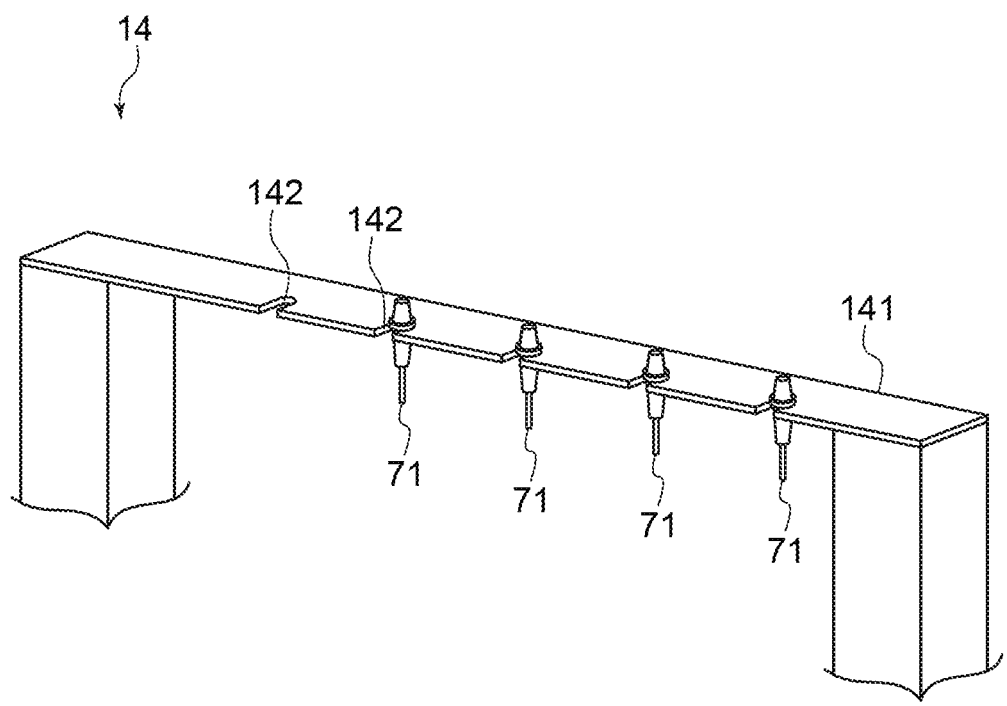
FIG. 9 is a schematic perspective view for explaining a second tool magazine capable of accommodating a second tool in another embodiment of the present invention.

In some embodiments, as illustrated in FIGS. 1, 5, 6, and 9, the wood processing system 1 described above further includes the second tool magazine 14 capable of accommodating a second tool 71. Here, FIG. 9 is a schematic perspective view for explaining a second tool magazine capable of accommodating a second tool in another embodiment of the present invention. As illustrated in FIG. 9, the second tool magazine 14 includes a plate-shaped rack 141 having a longitudinal direction, and a plurality of locking portions 142 arranged as being apart from each other in the longitudinal direction of the rack 141. As illustrated in FIG. 9, a semi-arc-shaped notch is formed at each of the locking portions 142, so that the second tool 71 is locked to the notch. The second tool magazine 14 is located within the movable range of the multi-articulated robot 5, as illustrated in FIGS. 1, 5, and 6.

According to the above-described configuration, since the wood processing system 1 includes the second tool magazine 14 capable of accommodating the second tool 71, the multi-articulated robot 5 facilitates replacing the second tool 71 and enables to efficiently process the wood 2.

Here, the product to be formed by processing the wood 2 described above may be a column or a beam constituting a wooden house, or may be a fixture material such as a head jamb, furniture, a woodworking craft, or the like. Thus, the above-described processing of the wood 2 includes not only cutting processing and formation of joints, holes, grooves, and the like, but also processing for the purpose of decoration.

In some embodiments described above, the wood conveying device 3 described above is configured to be capable of conveying the wood 2 along the longitudinal direction, but may be configured to convey the wood 2 not only along the longitudinal direction but also along a direction perpendicular to the longitudinal direction. In other words, the wood conveying device 3 may include a drive unit including a linear servomotor (not illustrated) for conveying the wood 2 along a direction perpendicular to the longitudinal direction. In this case, it is possible to increase the degree of freedom of processing the wood 2 by the multi-axis processing machine 4 and the multi-articulated robot 5.

In some embodiments described above, the drive units in the wood conveying device 3, the multi-axis processing machine 4, and the multi-articulated robot 5 each include a servomotor in which a rotation detector is incorporated therein. However, the drive units may each include a motor other than the servomotor. For example, the drive unit may include a ball screw mechanism and a motor that rotates a screw shaft of the ball screw mechanism.

In some embodiments, as illustrated in FIG. 4, a load sensor 17 detecting a load is arranged between the wrist 56 of the multi-articulated robot 5 and the holder 74 of the tool unit 7. In this case, by detecting the cutting resistance and the like of the wood 2 at the time of processing of the wood 2 by the load sensor 17, it is possible to adjust the feeding speed of the second tool 71 in accordance with the cutting resistance of the wood 2 and the like, so that the accuracy of processing by the multi-articulated robot 5 can be improved.

In some embodiments, as illustrated in FIGS. 5 and 6, the wood processing system 1 described above further includes a processed product storage 18 for placing the wood 2 processed by the multi-axis processing machine 4 and the multi-articulated robot 5. The multi-articulated robot 5 is configured to be capable of being attached with a conveying jig for conveying the wood 2 to the wrist 56. The processed product storage 18 is extended along the longitudinal direction (Y-axis) of the wood conveying device 3 and is arranged at a position away from the travelling rail 31 in the horizontal direction (X-axis) perpendicular to the longitudinal direction of the wood conveying device 3. In the embodiment illustrated in FIGS. 5 and 6, the processed product storage 18 is arranged on a side opposite to the travelling rail 31 across the multi-articulated robot 5 and the robot conveying rail 151. In this case, since the wood 2 can be carried into the wood conveying device 3 while the multi-articulated robot 5 is carrying the processed wood 2 to the processed product storage 18, workability can be improved. Further, since the processed product storage 18 is arranged on the side opposite to the travelling rail 31 across the multi-articulated robot 5 and the robot conveying rail 151, it is possible to prevent increase in size of the wood processing system 1.

In some embodiments, as illustrated in FIG. 6, the wood processing system 1 described above further includes a mounting hardware storage 19 for placing mounting hardware. The mounting hardware is for joining the wood 2 to other wood 2, and is fixed to the wood 2 by a fixing member such as a screw. As illustrated in FIG. 6, the mounting hardware storage 19 is arranged at a position away from the travelling rail 31 in the horizontal direction (X-axis) perpendicular to the longitudinal direction of the wood conveying device 3. In the embodiment illustrated in FIG. 6, the mounting hardware storage 19 is arranged on the side opposite to the travelling rail 31 across the multi-articulated robot 5 and the robot conveying rail 151. Further, the second tool 71 includes a mounting tool for securing mounting hardware, such as a screwdriver bit, to the wood 2. In this case, the mounting hardware can be attached to the wood 2 by the multi-articulated robot 5. Therefore, it is not necessary to separately provide a work space for performing the work of attaching the mounting hardware, it is possible to prevent increase in size of the wood processing system 1.

In some embodiments, the multi-axis processing machine 4 described above and the multi-articulated robot 5 described above are arranged at positions where movable ranges thereof do not overlap with each other. In this case, since the multi-axis processing machine 4 and the multi-articulated robot 5 does not interfere and operations thereof are not restricted, it is possible to improve the workability of each of the multi-axis processing machine 4 and the multi-articulated robot 5.

In some other embodiments, the multi-axis processing machine 4 described above and the multi-articulated robot 5 described above are arranged at positions where the movable ranges thereof overlap with each other. In this case, since the multi-axis processing machine 4 and the multi-articulated robot 5 can be arranged at close positions, the multi-axis processing machine 4 and the multi-articulated robot 5 can be caused to simultaneously perform processing, and the number of times of movement of the wood 2 by the wood conveying device 3 can be reduced. Further, since the multi-axis processing machine 4 and the multi-articulated robot 5 can be arranged at close positions, it is possible to prevent increase in size of the wood processing system 1. Further, instead of the tool changer 13 of the tool replacing unit 11, the multi-articulated robot 5 may attach or detach the first tool 6 to or from the spindle 41 of the multi-axis processing machine 4 or the first tool magazine 12. In this case, it is possible to prevent complication of the wood processing system 1.

Further, in some embodiments described above, when there is a risk of interference between the above-described multi-axis processing machine 4 and the above-described multi-articulated robot 5, the above-described second control unit 8 may perform a simulation before the operation of the above-described multi-axis processing machine 4 and the above-described multi-articulated robot 5 to confirm that there is no interference, and then, operate the above-described multi-axis processing machine 4 and the above-described multi-articulated robot 5.

Not limited to the embodiments described above, the present invention includes modifications of the embodiments and appropriate combinations thereof.

REFERENCE SIGNS LIST

1 Wood processing system
2 Wood
21 Grain

22 Knot
3 Wood conveying device
31 Travelling rail
32 Bench
4 Multi-axis processing machine
41 Spindle
42 Spindle moving device
421 First linear axis
422 Second linear axis
423 First rotational axis
424 Second rotational axis
43, 44 Column
45 Cross rail
46 Spindle supporting portion
47 First control unit
5 Multi-articulated robot
5A First multi-articulated robot
5B Second multi-articulated robot
50 Arm
501 First rotational axis
502 Second rotational axis
503 Third rotational axis
504 Fourth rotational axis
505 Fifth rotational axis
506 Sixth rotational axis
51 First arm
52 Second arm
53 Third arm
54 Fourth arm
55 Fifth arm
56 Wrist
57 Robot base
58 Controller
6 First tool
7 Tool unit
71 Second tool
72 Spindle
73 Drive unit
74 Holder
8 Second control unit
81 Input-output unit
82 Storage unit
821 Wood information data
822 Wood conveying device information data
823 Multi-axis processing machine information data
824 Multi-articulated robot information data
83 Arithmetic unit
84 Image processing unit
85 Bus
9 Wood supporting member
10 Floor surface
11 Tool replacing unit
12 First tool magazine
13 Tool changer
14 Second tool magazine
141 Rack
142 Locking portion
15 Multi-articulated robot conveying device
151 Robot conveying rail
152 Robot conveying table
153 Upper surface
16 Photographing unit
17 Load sensor
18 Processed product storage
19 Mounting hardware storage

The invention claimed is:

1. A wood processing system comprising:
a wood conveying device having a longitudinal direction along one direction in a horizontal direction and being capable of conveying wood along the longitudinal direction, the wood conveying device including a travelling rail extended along the longitudinal direction;
a multi-axis processing machine arranged on one side in the longitudinal direction of the wood conveying device, the multi-axis processing machine including a spindle capable of being attached with a first tool, and a spindle moving device having two or more linear axes perpendicular to one another and two or more rotational axes for moving the spindle;
at least one multi-articulated robot arranged along the wood conveying device on the other side in the longitudinal direction of the wood conveying device, the at least one multi-articulated robot including a wrist capable of being attached with a tool unit including a second tool, and an arm having six or more rotational axes for moving the wrist; and
at least one photographing unit capable of photographing the wood,
wherein the at least one photographing unit includes a first photographing unit arranged at positions away from the travelling rail in the horizontal direction perpendicular to the longitudinal direction of the wood conveying device, and
wherein the at least one multi-articulated robot includes a first multi-articulated robot arranged between the travelling rail and the first photographing unit in the horizontal direction.

2. The wood processing system according to claim 1,
wherein the at least one multi-articulated robot further includes a second multi-articulated robot arranged on a side opposite to the first multi-articulated robot across the travelling rail,
wherein the at least one photographing unit further includes a second photographing unit arranged on a side opposite to the first photographing unit across the travelling rail, and
wherein the second multi-articulated robot is arranged between the travelling rail and the second photographing unit in the horizontal direction.

3. The wood processing system according to claim 1, further comprising a multi-articulated robot conveyor capable of conveying the at least one multi-articulated robot along the longitudinal direction of the wood conveying device, the multi-articulated robot conveyor including a robot conveying rail extending along the longitudinal direction of the wood conveying device and arranged side by side with the travelling rail.

4. The wood processing system according to claim 1, further comprising:
an image processing unit detecting positional coordinates of the wood by image-processing a photographed image photographed by the at least one photographing unit.

5. The wood processing system according to claim 4,
wherein the image processing unit is configured to be capable of detecting at least one of a grain and a knot of the wood by image-processing the photographed image, and
at least one of the multi-axis processing machine and the multi-articulated robot performs a processing operation in accordance with a position of the grain or the knot of the wood.

6. The wood processing system according to claim 1,
wherein the wood conveying device further includes a bench arranged on the travelling rail and being capable of supporting the wood and reciprocating along the longitudinal direction of the travelling rail.

7. The wood processing system according to claim 6,
wherein the two or more linear axes of the spindle moving device include a horizontal linear axis extended along the horizontal direction perpendicular to the longitudinal direction of the wood conveying device, and a vertical linear axis extended along the vertical direction.

8. The wood processing system according to claim 1,
wherein the multi-axis processing machine further includes a pair of columns erected along a direction perpendicular to the longitudinal direction of the wood conveying device and being spaced apart from each other across the wood conveying device, and
the spindle moving device of the multi-axis processing machine includes a cross rail supported by the pair of columns and extending over the pair of columns and a spindle supporting portion supporting the spindle and being supported by the cross rail.

9. The wood processing system according to claim 1,
wherein the multi-articulated robot further includes a robot base to be placed on a grounding surface, and
the arm supports the wrist while being supported by the robot base.

10. The wood processing system according to claim 1, further comprising a tool replacing unit capable of replacing the first tool and including a first tool magazine capable of accommodating the first tool.

11. The wood processing system according to claim 1, further comprising a second tool magazine capable of accommodating the second tool.

12. The wood processing system according to claim 1, further comprising an image processing unit configured to detect a position of a knot in the wood by image-processing a photographed image photographed by the at least one photographing unit,
wherein, in a case where a position of a hole to be formed in the wood overlaps with the position of the knot in the wood, at least one of the multi-axis processing machine and the multi-articulated robot is configured to a shift a cutting position of the hole such that the cutting position of the hole is moved from a first position corresponding to the position of the knot in the wood to a second position different from the first position.

13. The wood processing system according to claim 1, further comprising an image processing unit configured to detect a grain in the wood by image-processing a photographed image photographed by the at least one photographing unit,
wherein, in a first case where a first cut in the wood is to be performed by cutting the wood in a direction perpendicular to a direction of the grain, a feed speed of a tool used by the multi-axis processing machine or the multi-articulated robot to perform the cutting the wood is a first speed, and
wherein, in a second case where a second cut in the wood is to be performed by cutting the wood in a direction along the direction of the grain, the feed speed of the tool used by the multi-axis processing machine or the multi-articulated robot to perform the cutting the wood is a second speed different from the first speed.

* * * * *